US006625640B1

(12) United States Patent
Zou et al.

(10) Patent No.: US 6,625,640 B1
(45) Date of Patent: Sep. 23, 2003

(54) MODEM HAVING EMBEDDED NETWORK TRANSMISSION PROTOCOLS

(75) Inventors: Zheng-Rong Zou, Chiang-Su (CN); Yong-Cai Bian, Chiang-Su (CN); Cheng-Shing Lai, Taipei (TW)

(73) Assignee: Inventec Corporation (TW)

( * ) Notice: Subject to any disclaimer, the term of this patent is extended or adjusted under 35 U.S.C. 154(b) by 0 days.

(21) Appl. No.: 09/387,505

(22) Filed: Sep. 1, 1999

(51) Int. Cl.[7] .......................... H04M 11/06; G06F 13/26
(52) U.S. Cl. ...................... 709/200; 709/230; 375/220; 375/222; 375/8; 370/465; 370/389
(58) Field of Search ................................ 375/220, 222, 375/8; 370/465, 389; 709/200, 230

(56) References Cited

U.S. PATENT DOCUMENTS

| | | | | |
|---|---|---|---|---|
| 5,146,472 A | * | 9/1992 | Hallman | 375/8 |
| 5,418,524 A | * | 5/1995 | Fennell | 340/825 |
| 5,862,474 A | * | 1/1999 | Kimball | 455/418 |
| 6,212,566 B1 | * | 4/2001 | Vanhoof et al. | 709/230 |
| 6,295,293 B1 | * | 9/2001 | Tonnby et al. | 371/389 |

FOREIGN PATENT DOCUMENTS

| | | | | |
|---|---|---|---|---|
| EP | 0381249 | * | 8/1990 | G06F/13/26 |
| WO | WO 97/47127 | * | 12/1997 | H04M/11/06 |

OTHER PUBLICATIONS

Preston, D. J. "Internet Protocols Migrate to Silocon for Networking Devices." Electronic Design. vol. 45, No. 8. Apr. 14, 1997, pp. 87–90, 92–93, XP000730016. ISSN: 0013–4872.*

Portable Computer and Communications Association—Modem Standards Committee: "The IP Modem Interface Standard." PCCA Draft, Online 5 Jun. 1998, XP002120914.*
"At Command Set Reference Guide for Expedite Wireless IP Modem." Novatel Wireless, Inc. PS–01016529, Revision 1. Apr. 7, 1999. pp. 1–70.*

* cited by examiner

*Primary Examiner*—David Wiley
*Assistant Examiner*—Alina A Boutah

(57) ABSTRACT

A modem having embedded network transmission protocols is provided. A fax/voice/high-speed data transmission 3-way modem is provided with an additional built-in Internet transmission protocol communication module. The communication module includes various Internet protocols (such as PPP, TCP/IP, UDP, HTTP, FTP, POP3, SMTP, etc) and various Internet application services that support those protocols. Moreover, the communication module can also connect to computers through either an internal line-connection end or a parallel/serial port. Furthermore, the network functions of network connection and the desired operations are established in advance under the support of the corresponding BIOS drivers, making the communication module capable of connecting to the network operations independently. Moreover, a microprocessor of the present communication module sets an internal network application temporary storage device, and in the mean while, the network communication service messages of the desired operations can be selectively [time] stored into an internal memory or a computer's memory automatically at a predetermined time. Any signal of the requiring network functions that has been established in advance once is detected, a wake-up signal is automatically sent out for trigging the computer, a network displaying facility and a computer peripheral facility for executing said network functions established in advance.

23 Claims, 5 Drawing Sheets

MODEM HAVING EMBEDDED NETWORK TRANSMISSION PROTOCOLS

BACKGROUND OF THE INVENTION

1. Field of the Invention

The present invention generally relates to a modem, and more particularly to a modem having embedded network transmission protocols, capable of automatic network connection without by any computer, and also able to make computers automatically connecting to the network at a predetermined time.

2. Description of the Prior Art

Accompanying with spread applications of Internet protocols in computers, such as: using HyperText Transfer Protocol (HTTP) and HyperText Markup Language (HTML) to edit, browse the Web and monitor status; using Post Office Protocol version 3 (POP3) and Simple Mail Transfer Protocol (SMTP) to receive and send electronic-mails (E-mails) and to carry out E-mail searching/calling functions; and using File Transfer Protocol (FTP) to transmit a large quantity of text data file information. There is a trend that Internet could replace computers. Although there are devices on sale directly connect to the Internet without by any computer, the functions of these devices still can not replace those of computers. Moreover, users of these devices need to dial a number and enter a name of the corresponding Internet Service Provider's (ISP's) server, i.e. the IP address when connecting to the network, and some even need an Internet account, making things even more tedious and annoying.

There is still a drawback via a computer connecting to Internet. That is, even though a modem is connected to the computer, TCP/IP, POP3/SMTP, HTTP communication software, etc. should be installed in the computer through WINDOW 95 or WINDOW 98 software, in order to get connection to Internet. Normally, computer hardware does not include Internet Protocol. Directly connecting a computer to Internet doesn't mean the computer can use Internet services. The computer needs to install Internet Protocol software in order to use Internet communication. Users, who are not familiar with Internet Protocol, would not know what to do, and due to complex operations, the so-call "plug and play" will not be achieved. Moreover, as mentioned before, in order for connection to Internet, one needs to dial a number and enter a name of the corresponding ISP's server, and even requires an Internet account. In particularly, for those notebook users, who constantly need to receive/send prompt messages, repeating the above tedious and annoying actions for each single connection, not only wasting time, but also unable to make prompt communication. It is very inconvenience for users.

SUMMARY OF THE INVENTION

An objective of the present invention is to provide a modem having embedded network communication transmission protocols, which is capable of automatically connecting to Internet without by any computer. Convenient network services thus can be obtained.

Another objective of the present invention is to provide a modem having embedded network communication transmission protocols, which can make a computer automatically connected to Internet at predetermined time, thus the purpose of convenient network services is obtained. The present modem having embedded network communication transmission protocols automatically executes all kinds of network communication transmission protocol software for implementing automatic network connection services. The users no longer need to operate the computer manually and dial a telephone number for connecting to Internet. Furthermore, the computer via the present modem can automatically execute various services of network protocol supports. For example, automatically browsing World Wide Web sites, automatically receiving/ sending electronic mails, automatically electronic mail searching/calling, automatically selecting network messages filtration, automatically downloading messages and data information, automatically executing network remote monitoring, automatically receiving/sending faxes, etc.

In accordance with the above objectives, the present invention provides a fax/voice/high-speed data transmission 3-way modem having an additional built-in Internet transmission protocol communication module. The communication module includes various Internet protocols, such as, Point-to-Point Protocol (PPP), Transmission Control Protocol/Internet Protocol (TCP/IP), User Datagram Protocol (UDP), HyperText Transfer Protocol (HTTP), File Transfer Protocol (FTP), Post Office Protocol version 3 (POP3), Simple Mail Transfer Protocol (SMTP), etc. The various Internet application services supported by those protocols are: World Wide Web browser engine, E-mail engine, remote control engine, network monitoring engine, network receiving/sending fax engine, network voice recording engine, etc.

Moreover, the communication module can also connect to computers through either an internal line-connection end or a parallel/serial port. The network functions of network connection and the desired operations are set in advance under the support of the corresponding BIOS drivers, making the module capable of connecting to the network operations independently. The computers are normally at the status of shutting down or waiting stage so as to avoid wasting power. An efficient resource saving is obtained. A microprocessor of the present communication module of the present invention can set an internal network application temporary storage device. The network communication service messages of the desired operations can be selectively stored into an internal memory of the microprocessor or a computer's memory automatically at a predetermined time. Any signal of the requiring network functions that has been established in advance once is detected, a wake-up signal is automatically sent out for trigging the computers, the network displaying facility and the computer peripheral facility for executing the network functions established in advance. In the entire system, the only part that requires manual input is inputting a dialing phone number, an Internet address and an account of an Internet Service Provider's server and the desiring network services at the first time according to a network service setting interface. These data are then stored into the present communication module and under the guidance of the corresponding supporting software to enter an automatic network connection service module.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
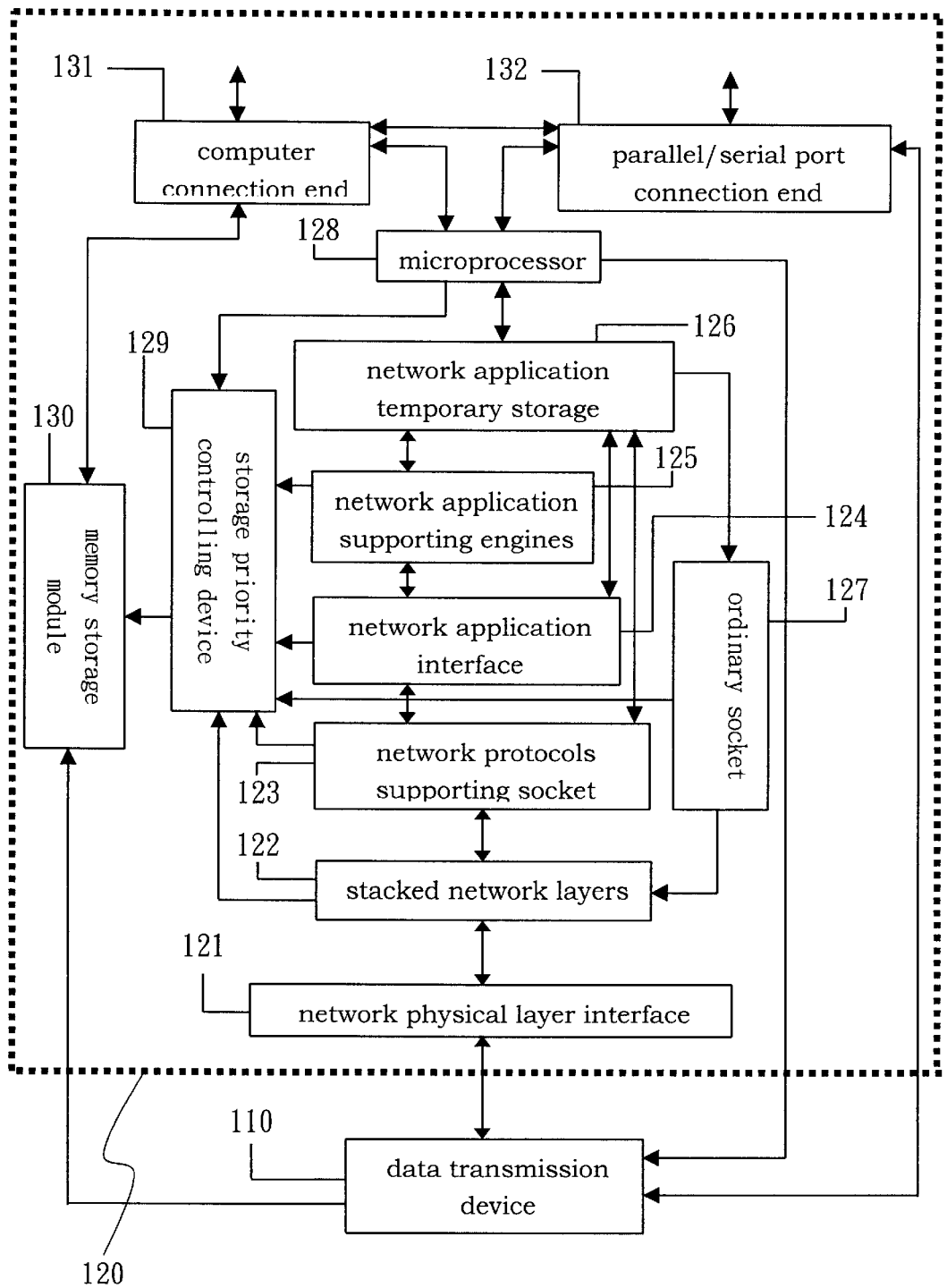
FIG. 1 is a system architectural diagram of a modem having embedded network transmission protocols of the present invention.

FIG. 1 is a system architectural diagram of a modem having embedded network transmission protocols of the present invention. The present high-speed data transmission modem includes a data transmission device 110, which converts digital signals to analog signals for transmission on the telecommunication network, and converts the analog signals received from the telecommunication network to digital signals. A protocol module 120 has been added in the data transmission device 110 in network transmissions to communicate messages and deliver data information through Internet. The protocol module 120 includes: a network physical layer interface 121; a stacked network layer 122 supporting the network protocols, including PPP, TCP/IP, User Datagram Protocol (UDP), etc.; a supporting network protocol socket 123, including HTTP, FTP, POP3, SMTP, etc.; a network application interface 124, including Web interface, E-mail interface, monitoring interface, etc.; a supporting network application engine 125, including World Wide Web engine, E-mail engine, remote control engine, network monitoring engine, network receiving/sending fax engine, network voice recording engine, etc.; a network application temporary storage device 126; an ordinary line-connection socket 127; a microprocessor 128; a storage priority controlling device 129; a memory storage module 130; a host computer connection end 131; and a parallel/serial port connection end 132.

Next, in the following, a more detailed description of the working principle of a modem having embedded network protocols of the present invention is provided. As we know that, hovering over Internet, a modem is the most fundamental equipment and in order to connect to the network system, the data transmission device 110 that has been included inside the modem must have the network physical layer interface 121. The network physical layer interface 121 must also connect to the stacked network layer 122 that comprises Internet Protocol. In accordance with the rules of TCP/IP included within Internet Protocol, all Internet Service Providers' servers must use the software that conforms to Internet Protocol rules, in order to send and receive network packet data information. Since PPP and TCP/IP are the most fundamental network transmission protocols, the stacked network layer 122 specially used in the network communication module must be able to execute TCP/IP. This particular work is accomplished in the prior art by the software established in the computer that conforms to Internet Protocol and is shared among all application engines established in the computer. And now, this particular work can be accomplished by the stacked network layer 122 added in the modem of the present invention. A corresponding point-to-point protocol is also included in the stacked network layer 122 to support network communication.

In addition, transmission data in the network is packaged. The standard format of Internet data packet is based on User Datagram Protocol (UDP), which makes the format of the network packet doesn't need to rely on other network techniques. Internet data are placed in a network packet and is sent out throughout the entire network. Once the network packet arrives in a computer or a network facility, the computer will de-pack the packet, extract the data, check for the packet's destination address, and work out how to handle the data. In order to realize the path selection of the data and the transmission thereof, each computer that links to the network must be assigned an Internet address or account. The prior method needs to install related Internet software for entering Internet address or account. However, the method for automatic network connection of the present invention only require to enter and store Internet address or account into the present modem once through the computer or other network facility. Thereafter, the network protocol module 120 will automatically accomplish the network connection job.

Moreover, on this fundamental TCP/IP, as what is shown in FIG. 1, the network protocol module 120 further established the supporting network protocol socket 123, the network application interface 124, and the supporting network application engine 125 for establishing network functions in advance, for example, Hyper Text Transfer Protocol (HTTP) and File Transfer Protocol (FTP) of the World Wide Web engine and the remote control engine; Post Office Protocol version 3 (POP3) and Simple Mail Transfer Protocol (SMTP) of the E-mail supporting engine and the fax/voice engine. These network application interfaces and engines can be established through the network application temporary storage device 126 inside the module. The network application temporary storage device 126 can transmit data to the stacked network layer 122 and/or to the storage priority controlling device 129 through the ordinary line-connection socket 127. The storage priority controlling device 129 decides the priority sequence of storing the data information from the stacked network layer, the supporting network protocol socket, the network application interface, the supporting network application engine, the ordinary line-connection socket and the microprocessor 128 to the memory storage module 130.

When a corresponding application engine is on duty, the temporal messages and data information that are required can be firstly stored into the memory storage module 130 within the module through the storage priority controlling device 129. Once the microprocessor 128 detected the memory storage module 130 with insufficient storage capacity, it will send out a wake-up signal for trigging the host computer and/or other storage mediums, and also trigging the corresponding software for downloading to the external mediums for storage and display. The microprocessor 128 is also used to manage the connection job between the present module and the network during the shutdown of the host computer and/or other network connection facilities. It monitors the original built-in data transmission device 110, and at the same time, communicating with the computer and/or other network connection facilities. Moreover, the microprocessor 128 can set the method of connecting the computer to the network, and the network functions of the modem under the support of the corresponding BIOS software. The above works only require one establishment by the computer keyboard, which includes the inputting task for Internet address and/or account and for connection telephone number. As a result, the modem having embedded network transmission protocols of the present invention can connect to the network independently at a predetermined time, which doesn't need to activate the host computer or any other network connection facilities. Power wasting can be avoided and hence achieving an efficient resource saving. Once the microprocessor 128 of the present protocol module 120 detects any signal of the requiring network functions that has been established in advance, it will follow the automatic guidance of a corresponding software to wake-up the host computer and/or the network displaying facilities through the host computer connection end 131 and/or the parallel/serial port connection end 132 in order to display the requiring network function messages. The microprocessor 128 can also trigg peripheral equipments to carry out the network monitoring functions. Certainly, the execution of the above functions needs support of the BIOS software, bringing quite convenience for users.

Figure 2:
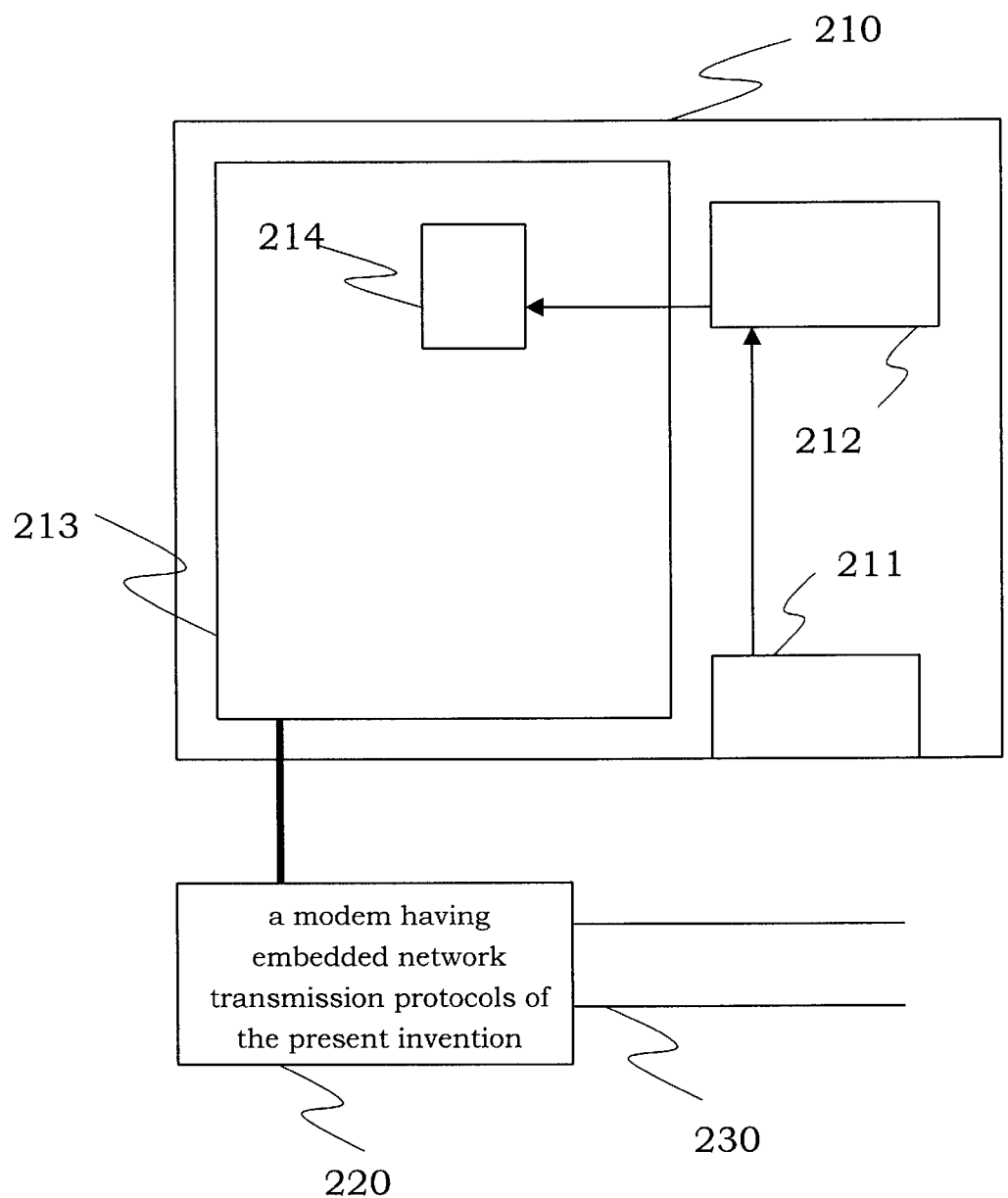
FIG. 2 is an illustrative diagram of showing the relationship between the modem having embedded network transmission protocols of the present invention and a computer.

FIG. 2 shows a diagram of a connection between a modem 220 having embedded network protocols of the present invention and a computer 210. The interior components of the computer 210 mainly have a power switch 211, a power supply 212, a motherboard 213 and a microprocessor 214, etc. The modem 220 of the present invention connects to the network by a phone line 230. The computer 210 is off-line at ordinary time and can be connected to the network at a predetermined time. The service jobs of network connection are automatically accomplished by the modem 220 of the present invention, including network data message transmission and/or remote control. The modem 220 of the present invention can also connect to other network facilities.

Figure 3:
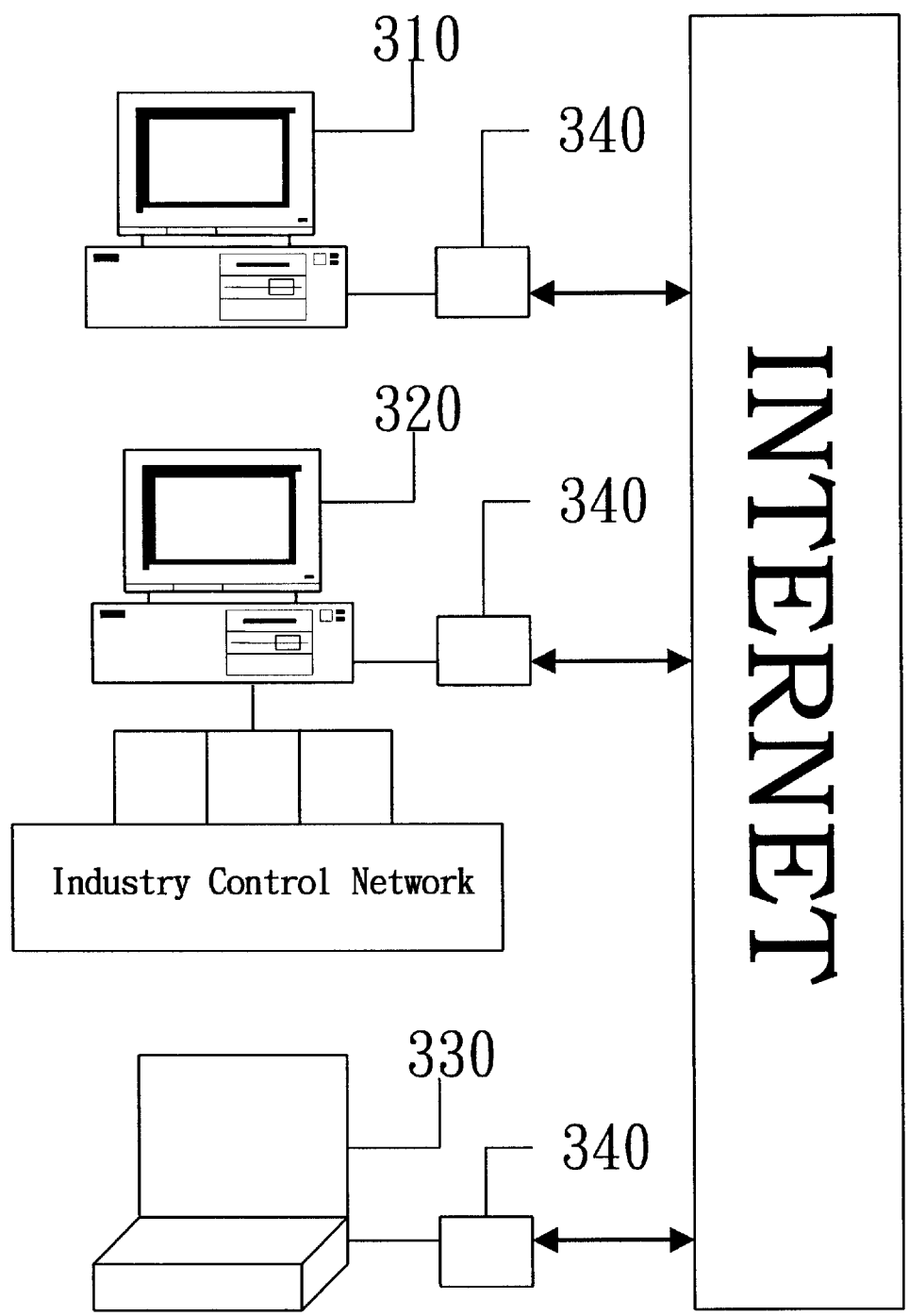
FIG. 3 is an illustrative diagram, showing remote monitor/control for office and factory computers through the modem having embedded network transmission protocols of the present invention.

FIG. 3 is a diagram, showing remote monitor/control of office and factory computers through the modem having embedded network protocols of the present invention. Accompanying with the spread application of the computer, the work way of people tends to become more elastic, people can use a household computer to remotely operate and control office and factory computers. Moreover, there is no need to turn on the computer for getting an automatic display of the requiring network services. All of the above execution can be achieved by installing the modem of the present invention. It is simply because the modem of the present invention comprises PPP, TCP/IP, FTP, HTTP, etc., hence capable of carrying out remote data transmission and monitoring factory's operating conditions. In accordance with what is shown in FIG. 3, all computers are installed with a modem 340 of the present invention. Computer 310 is an office computer used for remote data transmission. Computer 320 is a factory computer, which brings monitoring into practice. Computer 330 is a household notebook. When working at home, the office computer 310 and the factory computer 320 establish network connection only by a modem 340 of the present invention. The requiring network remote control functions and file transmission function are also established in advance for transmitting the office computer's messages and the factory computer's monitoring data to the household notebook 330. At the same time, establishing the IP address of the household notebook 330, the office computer 310 and the factory computer 320 in advance and storing into the respective modem 340. Under supporting of the corresponding software, the household notebook 330 can automatically enter the office computer 310 and the factory computer 320 at a predetermined time.

Figure 4:
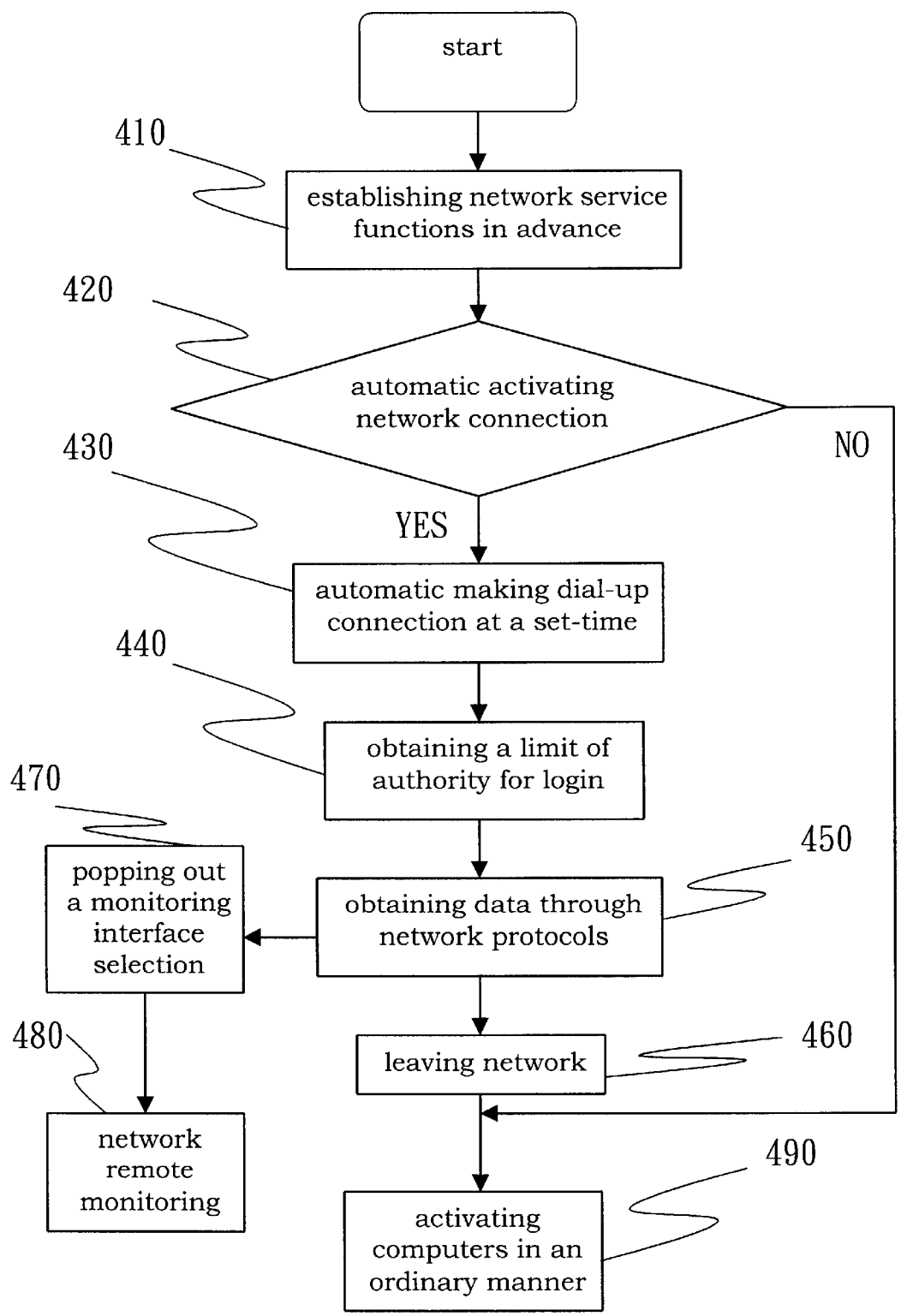
FIG. 4 is a process flowchart of activating network transmission protocols through the modem having embedded network transmission protocols of the present invention.

The operating flowchart of the above is shown in FIG. 4. First of all, at step 410, the user turns on the computer and establishes corresponding network services, such as, remote monitoring, file transferring back, as well as the corresponding IP address for the computer. Then, at step 420, the user can choose whether to turn on the computer at a predetermined time for displaying a message monitoring homepage and information to be obtained. Sequentially, at step 430, automatically making dial-up connection to the notebook at a predetermined time, and receiving the authority for login to the computer at step 440. Once success in login to the computer, the computer having been login will be automatically turned on for network connection. At step 450, under the support of the corresponding BIOS software, the corresponding network protocols will be automatically activated for receiving information. Then, at step 460, leaving the network, or at step 470, sending out controlling messages to pop out a monitoring interface selection for carrying out network remote control at step 480. At step 490, if the automatic connection to network at a predetermined time is not needed, the computer can still be turned on by the ordinary manner.

Figure 5:
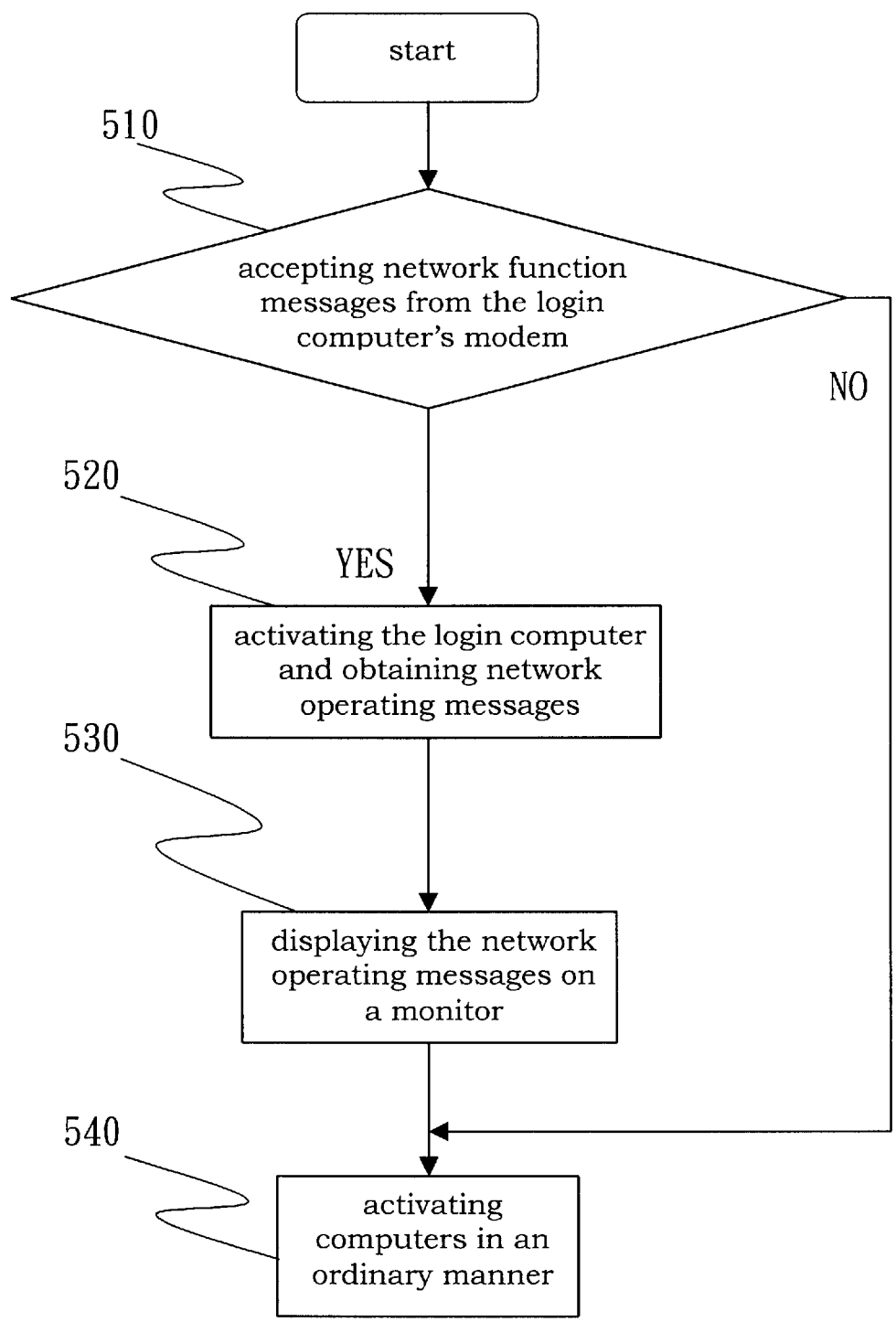
FIG. 5 is a process flowchart of automatic activating network connection of basic input/output systems of office and factory computers through the modem having embedded network transmission protocols of the present invention.

FIG. 5 is the operating flowchart of network connection by BIOS automatic activation. At step 510, when a modem of the desired login computer accepts and downloads the advance established network function messages, a "warning" signal will be generated. At step 520, the microprocessor 128 of the network protocol module 120 will send out a controlling signal to activate the computer. At step 530, the computer will automatically activate the advance established network functions by BIOS for receiving network's operating messages from the modem, and displaying the messages on the computer monitor. In the mean while, under the support of BIOS corresponding software and network protocols, the information of the office computer 310 and/or the messages of the factory monitoring computer 320 can then be transferred back to the household computer 330 by using a certain interface. Therefore, transmission and monitoring of network remote information can be realized, otherwise, at step 540, activating computers by the ordinary manner.

Although specific embodiments have been illustrated and described, it will be obvious to those skilled in the art that various modifications may be made without departing from what is intended to be limited solely by the appended claims.

What is claimed is:

1. A modem having embedded network transmission protocols, said modem comprising:

data transmission means, for converting digital signals to analog signals for transmission in a telecommunication network and converting the analog signals received from the telecommunication network to digital signals;

a network transmission protocol module, for communicating messages and delivering data information through Internet by means of said transmission means;

a network physical layer interface, for connecting a network system by means of said data transmission means;

a stacked network layer, connecting to said network physical layer interface to support internet protocol and internet data packet protocol for sending and receiving network packet data information and supporting network communication protocol;

a supporting network protocol socket, connecting to said stacked network layer;

a network application interface, connecting to said supporting network protocol socket;

a supporting network application engine, connecting to said network application interface and cooperating with said supporting network protocol socket and said network application interface for executing network functions established in advance;

network application temporary storage means, for establishing said supporting network protocol socket, said network application interface and said supporting network application engine for executing said network functions established in advance;

an ordinary line-connection socket, capable of transmitting data information from said network application temporary storage means to said stacked network layer;

a microprocessor, automatically sending a wake-up signal for trigging a computer and a network displaying facility and a computer peripheral facility to execute said network functions established in advance once upon a signal of said network functions established in advance is detected by said microprocessor;

storage priority controlling means, for deciding a priority sequence of storing data information from said stacked network layer, said supporting network protocol socket, said network application interface, said supporting network application engine, said ordinary line-connection socket and said microprocessor;

a memory storage module, for storing data information in accordance with said priority sequence decided by said storage priority controlling means;

a computer connection end, for transmitting data information with a connected computer; and a parallel/serial port connection end, for transmitting data information with a network connection facility.

2. The modem of claim 1, wherein said stacked network layer further comprising transmission control protocol/internet protocol.

3. The modem of claim 1, wherein said stacked network layer further comprising user datagram protocol.

4. The modem of claim 1, wherein said stacked network layer further comprising point-to-point protocol.

5. The modem of claim 1, wherein said supporting network protocol socket further comprising hypertext transfer protocol.

6. The modem of claim 1, wherein said supporting network protocol socket further comprising file transfer protocol.

7. The modem of claim 1, wherein said supporting network protocol socket further comprising post office protocol.

8. The modem of claim 1, wherein said supporting network protocol socket further comprising simple mail transfer protocol.

9. The modem of claim 1, wherein said network application interface further comprising world wide web interface.

10. The modem of claim 1, wherein said network application interface further comprising electronic mail interface.

11. The modem of claim 1, wherein said network application interface further comprising monitoring interface.

12. The modem of claim 1, wherein said supporting network application engine further comprising world wide web engine.

13. The modem of claim 1, wherein said supporting network application engine further comprising electronic mail engine.

14. The modem of claim 1, wherein said supporting network application engine further comprising remote control engine.

15. The modem of claim 1, wherein said supporting network application engine further comprising network monitoring engine.

16. The modem of claim 1, wherein said supporting network application engine further comprising network sending/receiving fax engine.

17. The modem of claim 1, wherein said supporting network application engine further comprising network voice recording engine.

18. The modem of claim 1, wherein when said supporting network application engine is on duty, the temporal messages and data information required is firstly stored into said memory storage module through said storage priority controlling means.

19. The modem of claim 1, wherein said microprocessor sends a wake-up signal for trigging an external storage medium and a corresponding software for downloading to said external storage medium when detecting said memory storage module with an insufficient storage capacity.

20. The modem of claim 1, wherein when said network connection facility is shutdown, said microprocessor manages the job of network connection for said network transmission protocol module, monitoring said data transmission device and communicating with said network connection facility.

21. The modem of claim 1, wherein once said microprocessor sets a method for connecting to said network connection facility, said network functions established in advance for said modem and internet address, account, and a connection telephone number at a first time under the support of a basic input/output system software, said modem capable of connecting to internet independently at a predetermined time without activating said network connection facility.

22. The modem of claim 1, wherein once said microprocessor detects a signal of said network functions established in advance, said microprocessor follows an automatic guidance of a corresponding software and by means of said computer connection end to automatically wake-up said computer and said network connection facility.

23. The modem of claim 1, wherein once said microprocessor detects a signal of said network functions established in advance, said microprocessor follows an automatic guidance of a corresponding software and by means of said parallel/serial port connection end to automatically wake-up said computer, said network connection facility and said computer peripheral facility.

* * * * *